US008130464B2

(12) United States Patent  (10) Patent No.: US 8,130,464 B2
Wyman  (45) Date of Patent: Mar. 6, 2012

(54) METHOD AND SYSTEM FOR COMPENSATING FOR TAPE DEFORMATION

(75) Inventor: Robert O. Wyman, Longmont, CO (US)

(73) Assignee: Oracle America, Inc., Redwood, CA (US)

( * ) Notice: Subject to any disclaimer, the term of this patent is extended or adjusted under 35 U.S.C. 154(b) by 619 days.

(21) Appl. No.: 11/944,115

(22) Filed: Nov. 21, 2007

(65) Prior Publication Data

US 2009/0128940 A1 May 21, 2009

(51) Int. Cl.
*G11B 5/584* (2006.01)
(52) U.S. Cl. .................................................. 360/77.12
(58) Field of Classification Search ............... 360/77.12, 360/84, 85, 69, 48, 74.3, 132, 221, 13
See application file for complete search history.

(56) References Cited

U.S. PATENT DOCUMENTS

| 4,408,317 | A  | * | 10/1983 | Gilovich et al. ............. 360/74.3 |
| 4,428,011 | A  | * | 1/1984  | Gilovich et al. .............. 360/221 |
| 4,451,861 | A  | * | 5/1984  | Gilovich et al. ................ 360/84 |
| 4,467,983 | A  | * | 8/1984  | Ledun ......................... 242/332.4 |
| 5,101,311 | A  | * | 3/1992  | Richmond ...................... 360/69 |
| 6,108,168 | A  | * | 8/2000  | Clemons ....................... 360/132 |
| 6,216,970 | B1 | * | 4/2001  | Byrne et al. .................. 242/332 |
| 6,282,039 | B1 | * | 8/2001  | Bartlett .......................... 360/48 |
| 6,308,298 | B1 |   | 10/2001 | Blatchley et al. |
| 6,565,028 | B2 |   | 5/2003  | Sasaki et al. |
| 7,121,493 | B2 | * | 10/2006 | Hiraguchi et al. ......... 242/345.2 |

* cited by examiner

*Primary Examiner* — Fred Tzeng
(74) *Attorney, Agent, or Firm* — Brooks Kushman P.C.

(57) ABSTRACT

A method for compensating for tape deformation in a tape drive includes determining location of deformation on a tape; processing the tape in a first manner before and after the deformation; and processing the tape proximate the deformation in a second manner different than the first manner. The step of processing the tape in the first manner comprises recording data on the tape.

22 Claims, 3 Drawing Sheets

METHOD AND SYSTEM FOR COMPENSATING FOR TAPE DEFORMATION

BACKGROUND OF THE INVENTION

1. Field of the Invention

The invention relates to methods and systems for compensating for tape deformation.

2. Background Art

Magnetic tape provided with a tape cartridge may become deformed as it is wound onto a take-up reel of a tape drive. For example, mechanical distortions created by a leader block attached to the tape may cause deformations in the tape as the tape is wound around the take-up reel and on top of the leader block.

U.S. Pat. No. 6,216,970 discloses a method for reducing the effects of mechanical distortions created by a leader block. The method involves initially winding tape at a higher than normal tension to create a small band of tightly wound tape on a take-up reel. The band reduces the effects of mechanical distortion that may be present due to slight variations in the depth of insertion of the leader block into the take-up reel. The remainder of the tape is then wound on top of the band at normal operating tension.

SUMMARY OF THE INVENTION

According to one aspect of the invention, a method for compensating for tape deformation in a tape drive includes determining location of deformation on a tape; processing the tape in a first manner before and after the deformation; and processing the tape proximate the deformation in a second manner different than the first manner. The step of processing the tape in the first manner comprises recording data on the tape.

According to another aspect of the invention, a method for compensating for tape deformation in a tape drive comprises determining an expected location of deformation on a tape of a tape cartridge; processing the tape in a first manner before and after the expected location of deformation, wherein processing the tape in the first manner comprises writing data to the tape; and processing the tape proximate the expected location of deformation in a second manner different than the first manner.

A data storage system for processing a tape cartridge having a length of tape is also provided. The system comprises a tape drive configured to receive the tape cartridge, and a controller associated with the tape drive. The controller is configured to determine an expected or actual location of deformation on the tape of the tape cartridge, and to control processing of the tape in a first manner before and after the expected or actual location of deformation, wherein processing the tape in the first manner comprises recording data on the tape. The controller is further configured to control processing of the tape proximate the expected or actual location of deformation in a second manner different than the first manner.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
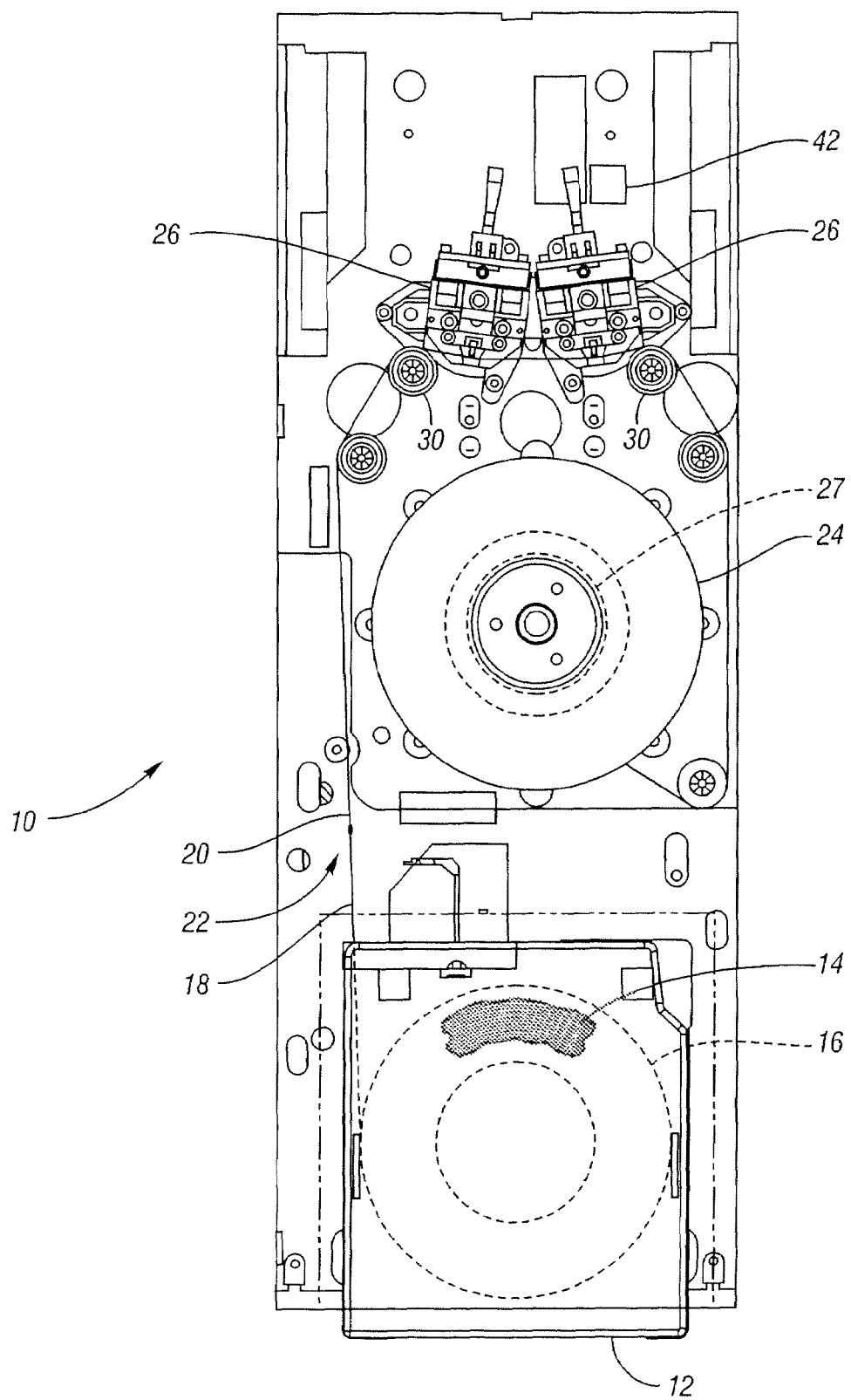
FIG. 1 is a plan view of a tape drive that is configured to receive a tape cartridge having a cartridge leader member attached to a length of magnetic tape.

FIG. 1 shows a tape drive 10 for receiving a tape cartridge 12 that has a length of magnetic tape 14 wound onto a supply reel 16. The tape cartridge 12 further has a cartridge leader member, such as a cartridge leader 18, attached to the tape 14, such as with adhesive tape.

The tape drive 10 has a drive leader member, such as a drive leader 20, that is attachable to the cartridge leader 18. After attachment, the drive leader 20 is configured to route the cartridge leader 18 and tape 14 along a tape path 22 and to a take-up reel 24 of the tape drive 10. For example, the drive leader 20 may be attached to the take-up reel 24, such that rotation of the take-up reel 24 causes the drive leader 20, cartridge leader 18 and tape 14 to be pulled along the tape path 22.

The tape drive 10 may further have one or more recording members, such as heads 26, for writing data to the tape 14 as the tape 14 is routed along the tape path 22. The heads 26 may also be configured to perform read operations such that data may be read from the tape 14. For example, each head 26 may include an array of write elements disposed between two arrays of read elements, such that each head 26 may perform read after write operations no matter what direction the tape 14 is moving.

Figure 2:
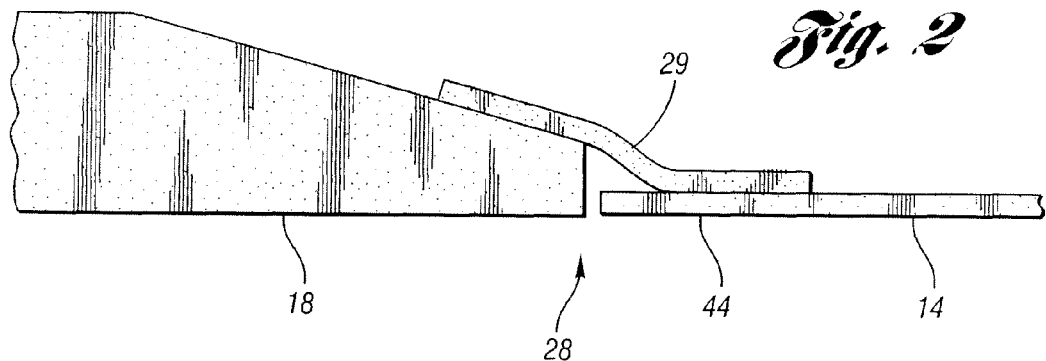
FIG. 2 is an enlarged side view of the cartridge leader member and tape.

During operation of the tape drive 10, the drive leader 20, cartridge leader 18 and tape 14 may be wound onto a hub 27 of the take-up reel 24. As a result of such winding, the tape 14 may become deformed due to various mechanical variations or irregularities, such as variations in thickness of the tape 14 and the associated cartridge leader 18 where the two components are joined together. Referring to FIG. 2, for example, cartridge leader 18 may have a thickness that is many times greater, such as 5 to 30 times greater, than the thickness of the tape 14 at a connection location 28 where the cartridge leader 18 and the tape 14 are joined together with a splice member, such as splicer tape 29. As a result, tape deformation may occur at locations where the tape 14 passes over the connection location 28 as the tape 14 is wound onto the take-up reel 24.

Figure 3:
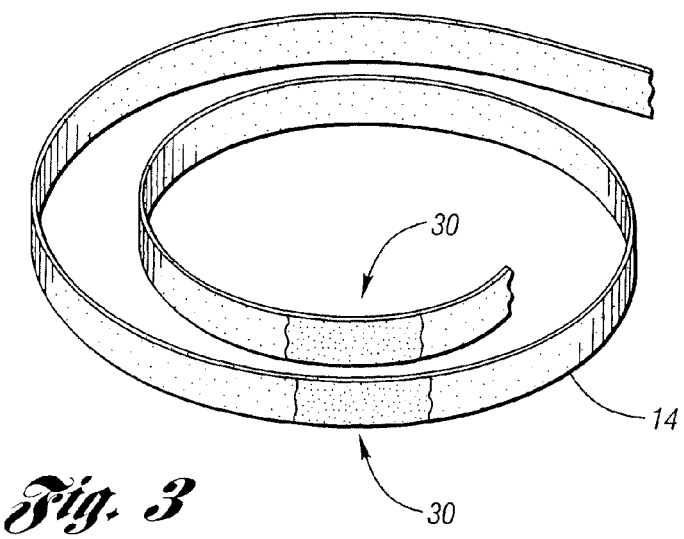
FIG. 3 is an enlarged view of the cartridge leader member connected to a drive leader member of the tape drive.

FIG. 3 shows a portion of tape 14 including actual areas of deformation 30 resulting from the tape 14 being wound over connection location 28. The size of each area of deformation 30 may depend on various parameters such as the degree of variation between the cartridge leader 18 and tape 14 at the connection location 28, the winding tension of the tape 14 on the take-up reel 24, and the number of tape wraps between the particular area of deformation 30 and the connection location 28. In the embodiment shown in FIG. 3, for example, the size of each area of deformation 30 may be in the range of 2 to 14 millimeters.

Moreover, tape deformation may result from any irregularity or mechanical variation between components. Examples of other locations that may cause tape deformation include connections between the cartridge leader 18 and drive leader 20, and between the drive leader 20 and take-up reel 24.

Figure 4:
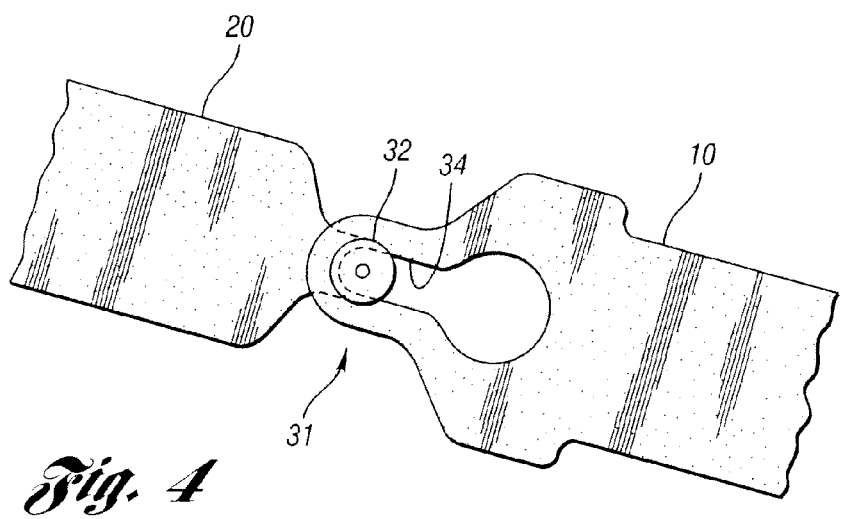
FIG. 4 is a fragmentary view of a section of the tape showing areas of deformation.

Referring to FIG. 4, for example, a connection location 31 where the cartridge leader 18 and the drive leader 20 are joined together may include a connection feature, such as a projection, that may cause tape deformation as the tape 14 passes over the connection location 31. In the embodiment shown in FIG. 4, for example, the drive leader 20 includes a projection, such as a button 32, that is received in an aperture 34 of the cartridge leader 18

Figure 5:
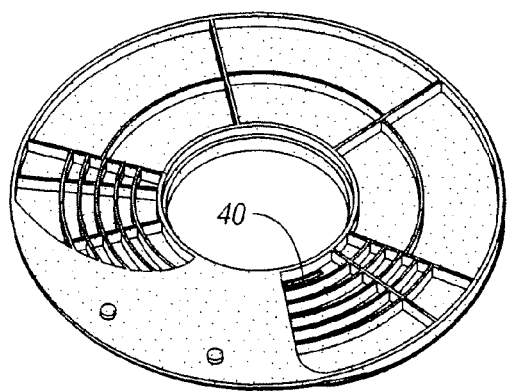
FIG. 5 is an exploded perspective view of a take-up reel and the drive leader member of the tape drive.

Referring to FIG. 5, a connection location 36 where the drive leader 20 and the take-up reel 24 are joined together may also cause tape deformation. In the embodiment shown in FIG. 5, fore example, an end 38 of the drive leader 20, which is received in slots 40 of the take-up reel 24, may cause tape deformation as the tape 14 is wound over the end 38.

A prior solution for addressing the problem of tape deformation involves wrapping many layers of tape 14 over the connection location 28, as well as the connections locations 31 and 36, to sufficiently mask or cover any expected or actual tape deformations before the tape drive 10 records any data onto the tape 14. This practice, however, consumes both time and recording media.

Under the invention, a method of compensating for tape deformation during a write operation is provided. The method may involve determining one or more expected or actual locations of deformation on the tape 14. The method may further involve processing the tape 14 in a first manner before and after each expected or actual location of deformation, wherein processing the tape 14 in the first manner includes recording data on the tape 14. In addition, the method may involve processing the tape 14 proximate each expected or actual location of deformation in a second manner different than the first manner. With such an approach, more of the tape 14 may be utilized for data recording, and quicker access to the tape 14 may be provided.

Determination of expected or actual locations of deformation may be performed in any suitable manner. For example, a controller 42 (shown in FIG. 1), which may include a micro-processor and/or electronic circuitry for instance, of the tape drive 10 or of a system that includes tape drive 10 may be used to predict expected locations of tape deformation based on such parameters as diameter of the hub 27 of the take-up reel 24, the angular orientation of the take-up reel 24, winding tension, the lengths of the cartridge leader 18 and drive leader 20, and the degree of irregularity at the connection locations 28, 31 and 36. Similarly, if the tape cartridge 12 has been used previously with the tape drive 10, the controller 42 may use the above information to determine actual locations of tape deformation.

As used herein, the term "controller" means one or more controllers, such as multiple controllers that may communicate with each other directly or indirectly. Similarly, the term "processor" means one or more processors, such as multiple processors that may communicate with each other directly or indirectly.

The controller 42 may also instruct or otherwise control the heads 26 to process the tape in the first manner, including recording data onto the tape 14 in a typical manner, before and after the expected or actual locations of deformation. For example, the heads 26 may each perform a write operation followed by a read operation on the tape 14 before and after the expected or actual locations of deformation. By using such a read after write approach, the tape drive 10 can determine if data was sufficiently recorded on the tape 14. If data quality detected during the read operation is not sufficient, the heads 26 may be instructed or otherwise controlled to re-record the same data on the tape 14 at a location downstream of the insufficiently or improperly recorded data. Data recorded in the typical manner may be considered essential data, such as user data or customer data.

Proximate expected or actual locations of deformation, however, the tape drive 10 may process the tape 14 in the second manner. For example, when a section of tape 14 including an expected or actual location of deformation is about to pass over or is passing over one of the heads 26, the controller 42 may instruct or otherwise control that head 26 to 1) stop recording data to the tape 14, 2) record non-essential data, such as filler data or pad data, over the particular section of tape 14, or 3) record redundant data on the particular section of tape 14.

Under the first approach for processing the tape 14 in the second manner, no data is recorded at each expected or actual location of deformation. As a result, data gaps will be present along the tape 14.

Under the second approach, non-essential data may be recorded at each expected or actual location of deformation. Examples of such data include null data containing all zeros, non-user data or non-customer data, and counting data or clock synchronization data. With this approach, data gaps along the tape 14 may be avoided, and the tape drive 10 may remain synchronized with the data stream from the tape 14.

Under the third approach, redundant data may be recorded at each expected or actual location of deformation. For example, at such locations, the controller 42 may override the typical read after write check and automatically instruct or otherwise control one of the heads 26 to record redundant data without waiting for a read back signal (although a read back check of recorded redundant data may still be performed). As a result, the redundant data may remain in the proper chronological order as compared to downstream and upstream data. By contrast, in a typical read after write operation, if data is determined to be of insufficient quality during the read operation, the particular head 26 has already written additional data to the tape 14 by the time the head 26 is instructed or otherwise controlled to re-record the previously recorded data having insufficient quality. In that case, the redundant data is not in proper chronological order as compared to surrounding data.

The above approaches may also be combined in any suitable manner. For example, referring to FIGS. 1 and 2, the controller 42 may instruct or otherwise control the heads 26 to discontinue recording data at each expected or actual location of deformation near an end 44 of the tape 14 that is connected to the cartridge leader 18, where the degree or severity of tape deformation is likely to be the greatest. The controller 42 may then control operation of the tape drive 10 in accordance with the second or third approach further away from the end 44.

Once the tape drive 10 has determined that the tape 14 passing over the heads 14 is sufficiently free of actual or expected locations of deformation, then the tape drive 10 may write data to the remaining length of tape 14 in the typical manner. For example, after the controller 42 has determined that a sufficient length of tape 14 (for example, 20 to 30 meters of tape 14) has wrapped around or will be wrapped around the hub 27 to sufficiently cover or mask the connection location 28, or other irregularity, and thereby avoid any further appreciable deformation of the tape 14, the controller 42 my instruct or otherwise control the heads 26 to continuously record data along the remaining length of tape 14 using a write operation followed closely by a read after write operation, which may be referred to as a combined write and read after write operation.

Figure 6:
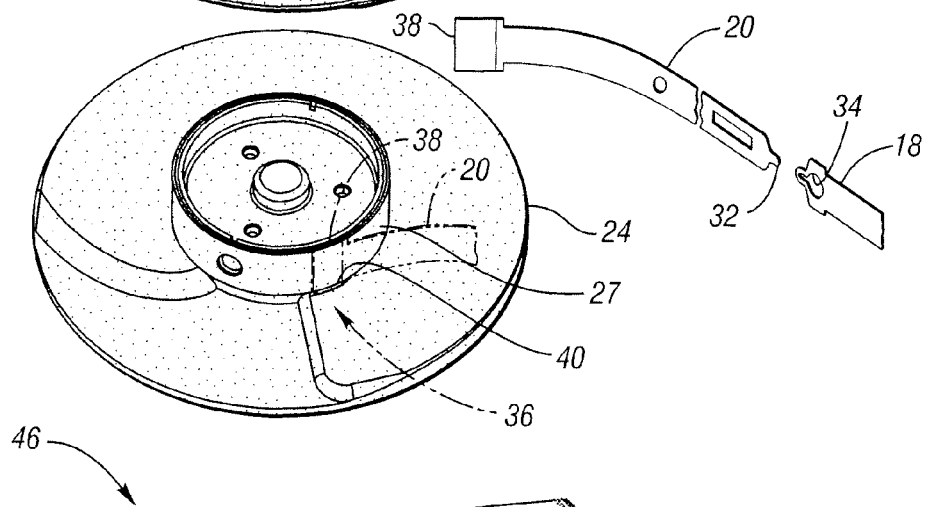
FIG. 6 is a perspective view of a data storage system including multiple different tape drives.
Figure 6:
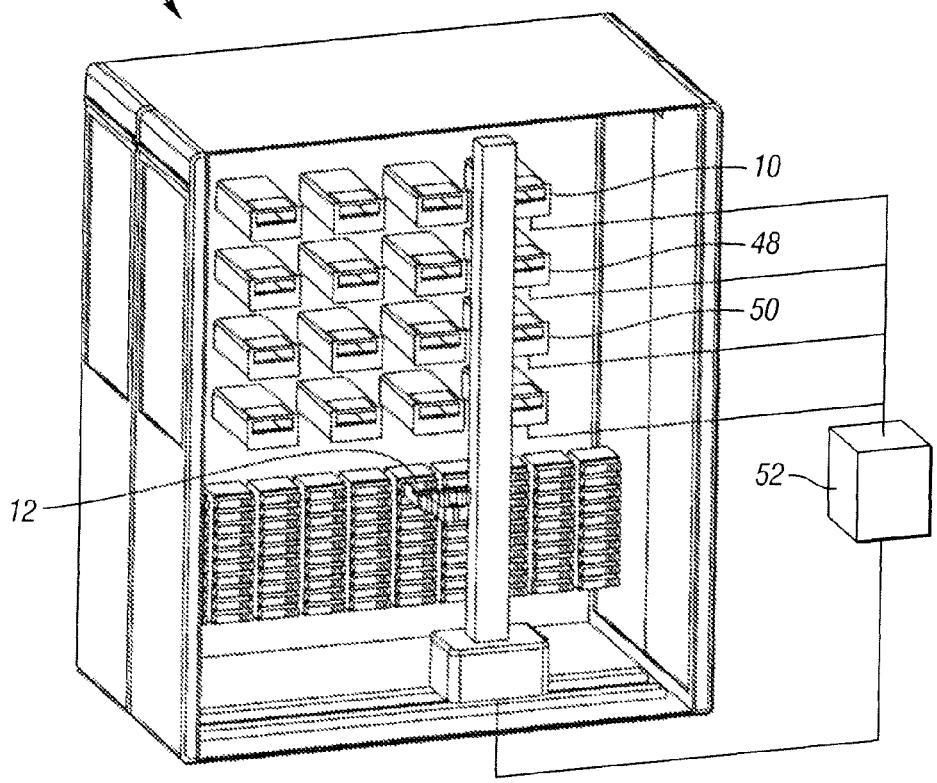

If the tape cartridge 12 is used with other tape drives having different configurations than the tape drive 10, then the method of the invention may also involve compensating for tape deformation caused by such other tape drives. Referring to FIG. 6, for example, the tape cartridge 12 may be used with a data storage system 46 having multiple different tape drives, such as tape drives 10, 48 and 50, that may have different drive leader lengths, different take-up reel hub diameters, etc. With such an arrangement, the system 46 may be configured to determine one or more expected or actual locations of deformation on tape 14 associated with each tape drive 10, 48 and 50. For example, a controller 52, which may include a processor and/or electronic circuitry for instance, of the system 46 may predict expected locations of tape deformation for each tape drive 10, 48 and 50 based on such parameters as take-up reel hub diameter, take-up reel angular orientation and drive leader length of each tape drive 10, 48 and 50, as well as cartridge leader length of the tape cartridge 12. Similarly, if the tape cartridge 12 has been used previously with each tape drive 10, 48 and 50, the controller 52 may use the above information to determine actual locations of tape deformation.

When the tape cartridge 12 is inserted into a particular tape drive 10, 48 or 50, the system 46 may then process the tape 14 in the first and second manners described above, but taking into account the expected or actual locations of deformation associated with one or more of the tape drives 10, 48 and 50. For example, if the tape cartridge 12 has been or will be used with each of the tape drives 10, 48 and 50, the controller 52 may instruct or otherwise control the system 46 to process the tape 14 in the first manner before and after each expected or actual location of deformation associated with each tape drive 10, 48 and 50. The controller 52 may also instruct or otherwise control the system 46 to process the tape 14 in the second manner proximate each expected or actual location of deformation associated with each tape drive 10, 48 and 50.

Once the system 46 has determined that the tape 14 passing over one or more heads of the particular tape drive 10, 48 or 50 is sufficiently free of actual or expected locations of deformation, then the system 46 may write data to the remaining length of tape 14 in the typical manner. For example, after the controller 52 has determined that a sufficient length of tape 14 has wrapped around the take-up reel of the particular tape drive 10, 48 or 50 to thereby avoid any actual or expected locations of deformation associated with any and all of the tape drives 10, 48 and 50, the controller 52 may instruct or otherwise control the heads of the particular tape drive 10, 48 or 50 to continuously record data along the remaining length of tape 14 using a combined write and read after write operation.

As will be appreciated by one of ordinary skill in the art, the above described controllers 42 and 52 may include software, hardware, or a combination of software and hardware for implementing or controlling any or all of the associated method steps. For example, each controller 42, 52 may include a computer readable storage medium having information stored thereon representing instructions that are executable by a processor of the controller 42, 52. Each controller 42, 52 may therefore include instructions for performing any or all of the associated method steps, or any portion of any method step. As another example, each controller 42, 52 may include data or logic circuitry for performing any or all of the associated method steps, or a portion of any method step.

As noted above, tape deformation may result from any irregularity or mechanical variation. For example, a tape cartridge may be provided with a cartridge leader member configured as a leader block connected to a length of tape, and mechanical variation at a location where the leader block attaches to a take-up reel hub of a tape drive may result in tape deformation as the tape is wound over that location. The methods described above may be applied to such an arrangement in order to compensate for tape deformation associated with the leader block.

While embodiments of the invention have been illustrated and described, it is not intended that these embodiments illustrate and describe all possible forms of the invention. In that regard, the words used in the specification are words of description rather than limitation, and it is understood that various changes may be made without departing from the spirit and scope of the invention.

What is claimed is:

1. A method for compensating for tape deformation in a tape drive, the method comprising:
   determining location of deformation on a tape prior to the deformation reaching any read element of the tape drive, wherein each read element is configured to read data from the tape;
   processing the tape in a first manner before and after the deformation; and
   processing the tape proximate the deformation in a second manner different than the first manner;
   wherein processing the tape in the first manner comprises recording data on the tape using a write element of the tape drive.

2. The method of claim 1 wherein processing the tape in the second manner comprises discontinuing recording of data on the tape proximate the deformation.

3. The method of claim 1 wherein processing the tape in the second manner comprises recording filler data on the tape proximate the deformation.

4. The method of claim 1 wherein processing the tape in the second manner comprises recording redundant data on the tape proximate the deformation.

5. The method of claim 1 wherein determining location of the deformation on the tape comprises determining angular position of a take-up reel onto which the tape is wound.

6. The method of claim 1 wherein determining location of the deformation on the tape is based on length of a leader member connected to the tape.

7. The method of claim 1 further comprising determining subsequent locations of deformation on the tape, processing the tape in the first manner before and after each subsequent location of deformation, and processing the tape proximate each subsequent location of deformation in the second manner.

8. The method of claim 1 wherein the tape is connected to a leader member at a connection location, and the connection location at least partially causes the deformation as the tape is wound onto a take-up reel.

9. The method of claim 8 wherein the take-up reel is part of the tape drive.

10. The method of claim 8 wherein the take-up reel is part of another tape drive.

11. A method for compensating for tape deformation in a tape drive, the method comprising:
    predicting an expected location of deformation on a tape of a tape cartridge before the expected location of deformation reaches a head of the tape drive, wherein the head is configured to read data from the tape;
    processing the tape in a first manner before and after the expected location of deformation, wherein processing the tape in the first manner comprises writing data to the tape; and
    processing the tape proximate the expected location of deformation in a second manner different than the first manner.

12. The method of claim 11 wherein processing the tape in the second manner comprises discontinuing writing of data to the tape proximate the expected location of deformation.

13. The method of claim 11 wherein processing the tape in the second manner comprises writing filler data to the tape proximate the expected location of deformation.

14. The method of claim 11 wherein processing the tape in the second manner comprises writing redundant data to the tape proximate the expected location of deformation.

15. The method of claim 11 wherein processing the tape in the second manner is performed such that no data is recorded on the tape proximate the expected location of deformation.

16. The method of claim 11 wherein the tape is connected to a leader member at a connection location, and the expected location of deformation coincides with the connection location as the tape is wound onto a take-up reel.

17. A data storage system for processing a tape cartridge having a length of tape, the system comprising:
   a tape drive configured to receive the tape cartridge, the tape drive having a head for recording data on the tape and for reading data from the tape; and
   a controller associated with the tape drive, the controller being configured to determine an expected or actual location of deformation on the tape of the tape cartridge prior to the expected or actual location of deformation reaching the head of the tape drive, and to control processing of the tape in a first manner before and after the expected or actual location of deformation, wherein processing the tape in the first manner comprises recording data on the tape, the controller further being configured to control processing of the tape proximate the expected or actual location of deformation in a second manner different than the first manner.

18. The system of claim 17 wherein the controller is configured to control processing of the tape in the second manner such that recording of data on the tape proximate the expected or actual location of deformation is discontinued.

19. The system of claim 17 wherein the controller is configured to control processing of the tape in the second manner such that filler data is recorded on the tape proximate the expected or actual location of deformation.

20. The system of claim 17 wherein the controller is configured to control processing of the tape in the second manner such that redundant data is recorded on the tape proximate the expected or actual location of deformation.

21. A method for compensating for tape deformation in a tape drive, the method comprising:
   determining location of deformation on a tape;
   processing the tape in a first manner before and after the deformation; and
   processing the tape proximate the deformation in a second manner different than the first manner;
   wherein processing the tape in the first manner comprises recording data on the tape, and wherein determining location of the deformation on the tape comprises determining angular position of a take-up reel onto which the tape is wound.

22. A method for compensating for tape deformation in a tape drive, the method comprising:
   determining location of deformation on a tape;
   processing the tape in a first manner before and after the deformation; and
   processing the tape proximate the deformation in a second manner different than the first manner;
   wherein processing the tape in the first manner comprises recording data on the tape, and wherein determining location of the deformation on the tape is based on length of a leader member connected to the tape.

* * * * *